United States Patent [19]

Shiroishi et al.

[11] Patent Number: 5,147,732
[45] Date of Patent: Sep. 15, 1992

[54] LONGITUDINAL MAGNETIC RECORDING MEDIA AND MAGNETIC MEMORY UNITS

[75] Inventors: Yoshihiro Shiroishi, Hachioji; Takeo Yamashita, Tachikawa; Sadao Hishiyama, Sayama; Noriyuki Kumasaka, Ome; Yoshibumi Matsuda, Kokubunji; Hiroyuki Suzuki, Kawasaki; Kazumasa Takagi, Nishitama; Norikazu Tsumita, Kanagawa; Masaki Ohura, Odawara; Tomoyuki Ohno, Kokubunji, all of Japan

[73] Assignee: Hitachi, Ltd., Tokyo, Japan

[21] Appl. No.: 412,988

[22] Filed: Sep. 26, 1989

[30] Foreign Application Priority Data

Sep. 28, 1988 [JP] Japan ................. 63-241102

[51] Int. Cl.⁵ .................................. G11B 23/00
[52] U.S. Cl. ................... 428/668; 428/694; 428/900; 428/928
[58] Field of Search .............. 428/611, 668, 694, 900, 428/928

[56] References Cited

U.S. PATENT DOCUMENTS

| 4,645,722 | 2/1987 | Katayama et al. | 428/900 |
| 4,745,510 | 5/1988 | Watanabe et al. | 428/694 |
| 4,900,622 | 2/1990 | Nakayama et al. | 428/900 |

Primary Examiner—Paul J. Thibodeau
Assistant Examiner—Leszek Kiliman
Attorney, Agent, or Firm—Antonelli, Terry, Stout & Kraus

[57] ABSTRACT

Disclosed are longitudinal recording media comprising a composite magnetic film formed on a nonmagnetic substrate directly or through a nonmagnetic underlayer, in which all of magnetic thin films constituting the composite magnetic film are magnetically connected, the composite magnetic film has a single in-plane coercivity, and the in-plane coercivity is greater than the in-plane coercivity of a longitudinal magnetically anisotropic magnetic thin film constituting a magnetic thin film nearest to an information recording side among the magnetic thin films constituting the composite film.

34 Claims, 5 Drawing Sheets

LONGITUDINAL

PERPENDICULAR

LONGITUDINAL MAGNETIC RECORDING MEDIA AND MAGNETIC MEMORY UNITS

BACKGROUND OF THE INVENTION

This invention relates to a magnetic recording medium in a magnetic memory unit, such as a magnetic disk unit, magnetic tape unit or magnetic card unit, and a high-capacity magnetic memory unit using same.

To achieve a high-capacity of a magnetic memory unit requires high recording density and high output to noise ratio. For this reason, conventional studies have focused on perpendicular magnetic recording methods using a perpendicular magnetic film and longitudinal magnetic recording methods using a thin film longitudinal medium. The historical backgrounds of these methods will be briefly discussed hereinbelow.

The perpendicular magnetic recording medium has a small interbit demagnetization field and, in principle, it is hence suitable for achievement of high recording density. However, the perpendicular magnetic recording medium has a defect that its output is small. In order to overcome this defect, various composite magnetic films have been heretofore proposed. For example, a perpendicular magnetic recording method has been assiduously studied to achieve high recording density. As a perpendicular magnetic recording medium which is highly producible and has good perpendicular orientation, Japanese Patent Kokai (Laid-open) No. 9821/1986 proposes a composite perpendicular magnetic film in which a Co-O or Co-Ni-O film having a thickness of 0.14–0.175 $\mu$m is further perpendicularly oriented on a CoCr film having perpendicular magnetic anisotropy. Further, composite magnetic recording media comprising a perpendicular magnetic thin film formed on a nonmagnetic substrate through a soft magnetic film with high permeability are also proposed in order to enhance read and write efficiency in high recording density and obtain high read output, as are discussed in Japanese Patent Kokai (Laid-open) Nos. 78403/1977, 5184/1979, etc. In general, the media are formed by an evaporation method, sputtering method, plating method, ion beam sputtering method, or the like. When a magnetic head for perpendicular magnetic recording is used with these composite magnetic recording media to carry out read and write in a state that the head is in contact, very high recording density is achieved. It is however said that when the magnetic head flies apart from a medium surface, the recording density in this method adversely decreases as compared with a conventional longitudinal recording method. Further, another problem of this method is that when a high permeable, soft magnetic layer is used as an underlayer, the perpendicular orientation of a perpendicular magnetic film formed thereon is degraded. In order to overcome this problem, Japanese Patent Kokai (Laid-open) No. 131228/1986 proposes a perpendicular magnetic recording medium in which a perpendicular magnetic film of Co-Cr, etc., is formed on a high permeable, soft magnetic underlayer of Ni-Fe, etc., through a nonmagnetic layer of Ti, etc., to prevent a magnetic interaction between this high permeable, soft magnetic layer and the perpendicular magnetic film, and a high permeable, soft magnetic layer of Ni-Fe is further formed thereon.

Further, Japanese Patent Kokai (Laid-open) No. 222022/1986, etc., propose perpendicular magnetic recording media in which a CoCr layer having a large saturation magnetization and magnetically perpendicular isotropy is formed on a magnetically isotropic low coercivity layer of CoCrNb or CoCrTa. In this case, in principle, CoCrNb or CoCrTa corresponds to what is called a high permeable, soft magnetic layer (high permeable underlayer). In these conventional composite magnetic recording media constituted of a perpendicular magnetic layer and a high permeable, soft magnetic layer, the soft magnetic layer merely plays auxiliary roles of efficiently directing the recording magnetic field of a magnetic head to the perpendicular magnetic layer and stabilizing a recording magnetization. That is, these two magnetic layers work, magnetically independently of each other. In such a constitution, since the magnetic films constituting a composite magnetic thin film have only a weak magnetic interaction, an in-plane magnetization curve is generally a simple superimpose of the in-plane magnetization curve of each of the layers. For this reason, the magnetization curve exhibits a magnetization jump and forms a so-called snake form, and any of the layers does not undergo magnetic reversal with the same in-plane coercive force. It is said that the snake-like magnetization curve having a plurality of coercivities is preferable for achievement of high recording density.

However, in order to enhance read and write efficiency, the perpendicular magnetic recording medium of any method requires the use of a main pole type magnetic head constituting a magnetic circuit with the high permeable underlayer, and it is thought that practical performance can be improved only when not only the recording method but also the entire system are changed, as is discussed in Japanese Patent Kokai (Laid-open) No. 261025/1985. In fact, when a perpendicular magnetic recording medium having this constitution is used to read and write with a conventional ring type magnetic head, the following problem takes place.

When the above composite perpendicular film medium, in which a perpendicular magnetic layer is formed on a high permeable underlayer, is used to read and write with a conventional ring type magnetic head for longitudinal recording, unlike a case of reading and writing with a main pole type perpendicular magnetic recording head, there is a problem that a very large, spike-like Barkhousen noise is generated from the high permeable underlayer, and even when the spike-like Barkhousen noise is decreased, the absolute value of media noise is large as is discussed in J. Appl. Physics 57 (1985), pages 3,964 to 3,966. It is also considered that like problems occur in a perpendicular multilayered film medium of Japanese Patent Kokai (Laid-open) No. 261025/1985 in which a high permeable, soft magnetic layer is formed on a perpendicular magnetic layer. The reasons therefore are that since the coercivity of the high permeable film is, in principle, as low as several Oe to 20 Oe and for some other reasons, a strong recording head field hardly reaches the CoCr perpendicular magnetic layer, and further that an output waveform is extremely deformed for the following reasons. That is, the perpendicular magnetic layer and the high permeable layer are magnetically weakly connected, and each of the layers responds to a recording field separately and is likely to undergo magnetization reversal separately. Further, the high permeable layer is formed under the perpendicular magnetic layer through a nonmagnetic intermediate layer having a thickness of about 200 Å in order to prevent an magnetic interaction between the high permeable layer and the perpendicular magnetic layer, and hence each of the layers undergoes magnetization reversal independently of the other for a recording field. Such problems do not take place in a main pole type magnetic head.

As discussed above, the perpendicular magnetic recording method essentially has markedly superior characteristics to the longitudinal magnetic recording method if a medium is used in a state that a head is in contact with the medium.

However, a study has been again under way especially recently of improvement in the longitudinal magnetic recording method using a conventional ring type magnetic head in a head-flying state o from the viewpoint of its entire system. As a thin film medium for longitudinal magnetic recording, it is necessary to develop a magnetic thin film material having high corrosion resistance, high saturation magnetization and high coercivity, and the following composite media have been proposed.

That is, as is discussed in Japanese Patent Kokai (Laid-open) Nos. 261026/1985, 261025/1985, etc., as a combination of a perpendicular medium and a longitudinal medium, there are proposals of a composite magnetic recording media and magnetic recording method in which a magnetic thin film of Co-Ni, etc., with high in-plane coercivity or a magnetic thin film of $\gamma$-$Fe_2O_3$, etc., with isotropic coercivity is formed on a perpendicularly magnetizable film of Co-Cr, etc., whereby read and write in high recording density are carried out by using a conventional ring head. As a medium which is usable according to the same method as above and further has a different constitution, Japanese Patent Kokai (Laid-open) No. 34721/1986 proposes a double-layer medium in which a Co-Cr perpendicular magnetic layer having a perpendicular coercivity of 400 Oe or more is formed on a high-coercivity Co-Pt longitudinal recording layer having an in-plane coercivity of 300 Oe.

Further, Japanese Patent Kokai (Laid-open) No. 256217/1987 proposes a highly corrosion-resistant, longitudinal composite magnetic recording medium in which a CoCr-based alloy layer is formed on a Co-based magnetic alloy layer of CoNi, CoPt, etc., with in-plane anisotropy. In this medium, the surface layer portion of the Co-based magnetic alloy is partially replaced with the CoCr-based alloy having higher corrosion resistance than the Co-based magnetic alloy.

SUMMARY OF THE INVENTION

As discussed above, it may be said that there have been strong demands for highly reliable magnetic recording media which further permit high S/N ratio and high density according to a conventional longitudinal magnetic recording method.

However, the above conventional composite medium, which is formed of a perpendicular magnetic film and a magnetic thin film with high in-plane coercivity or with high isotropic coercivity formed thereon, has a problem that high-density recording is impossible although it permits higher output than the perpendicular magnetic film. That is because the recording of information in the perpendicular magnetic film having a function of maintaining information recorded in a longitudinal magnetic film is insufficient. Namely, since a ring type head essentially has a small perpendicular component of recording head field, the ring type head is unsuitable for perpendicular magnetization, and further, since the perpendicular magnetic film and the head are opposed to each other through a longitudinal magnetic film, the space between these two members is larger and hence the recording is made difficult further. Furthermore, the present inventors' study has showed big unsettled problems for practical use that since the recording magnetization state in this case is especially unstable, and since the read output is also complicated and likely to cause peak shift and phase shift. Further, the above double-layer film medium in which a perpendicular magnetic film is formed on a high-coercivity longitudinal magnetic thin film has like problems.

Meanwhile, in the above longitudinal composite magnetic recording medium in which a CoCr-based alloy layer is formed on a Co-based magnetic alloy layer of CoNi, CoPt, etc., due to the use of the CoCr-based alloy having a smaller saturation magnetization than the Co-based alloy, its read output is decreased in exchange for improved corrosion resistance. Further, as a result of the present inventors' study, it has been found that its in-plane coercivity is also decreased as shown in Table 2. For this reason, it is now made clear that its use as a medium for high-density magnetic recording has a problem.

It is an object of this invention to provide, with good reproducibility, a longitudinal magnetic recording medium and a magnetic memory device which has a composite magnetic film which is free from the above problems such as peak shift, degradation of in-plane coercivity, etc., which permits stable read and write in high density and which further has high reliability concerning corrosion resistance, etc., and high signal to noise ratio.

The above object of this invention is achieved by a longitudinal magnetic recording medium composed of a nonmagnetic substrate and a composite magnetic film formed on the substrate directly or through a non-magnetic underlayer, wherein all of magnetic films constituting the above composite magnetic film are magnetically connected, the above composite magnetic film has a single in-plane coercivity and said in-plane coercivity is larger than the in-plane coercivity of a magnetically longitudinal thin film constituting the magnetic layer nearest to the information recording side among the magnetic films constituting the above composite magnetic film.

In the formation of the composite magnetic film, all of the magnetic films constituting the composite magnetic film are magnetically connected and the composite magnetic film is formed so as to have a single in-plane coercivity. As a result, all of the magnetic films simultaneously undergo magnetic reversal, the in-plane magnetization curve does not show a snake form, and peak shift, etc., do not occur.

Further, since the composite magnetic film is formed so as to have a larger coercivity than that of the magnetic film nearest to the information recording side, a high read output can be obtained.

This invention will be explained more in detail hereinbelow.

A highly corrosion-resistant medium giving a high single to noise ratio in high density can be obtained by the magnetic film nearest to the information recording side is a longitudinal magnetic thin film composed, as a main component, of an alloy containing at least one element selected from a first group consisting of Co and Fe and at least one element selected from a second group consisting of N, Tb, Gd, Mo, W, Y, Sm, Nd, Pr, Pm, Ce, Dy, La, Pt, Ir, Ti, Zr, Hf, V, Nb, Ta, Ru, Os, Rh, Pd, Al and Si, and/or Ni; the magnetic film nearest to the substrate side has components or composition different from those of the above magnetic film nearest to the information recording side, and is composed of an alloy containing, as a main component, at least one element selected from the above first group and at least one element selected from a third group consisting of Cu, Cr, Mo, W, Tb, Gd, Sm, Nd, Pr, Pm, Ce, Dy, Pt and Ir, and/or Ni; and further, all of the magnetic films constituting the composite magnetic film are constituted such that they are mutually magnetically connected and that the composite magnetic film has a single-in-plane coercivity of not less than 250 Oe at the time of magnetization reversal to an in-plane uniform magnetic field; whereby a highly corrosion-resistant medium giving a high signal to noise ratio in high density can be provided with good reproducibility.

The above selection of materials for the magnetic film nearest to the substrate side can increase orientation and crystallinity of a magnetic film informed thereon, and is preferable to control the in-plane coercivity of the composite magnetic film stably so as to be at a high value. It is considered that this is because the above elements, when added, are likely to be segregated in grains and/or at grain boundaries. The total amount of elements from the above second group is adjusted to not less than 0.1 at % and not more than 30 at %, preferably not less than 0.5 at % and not more than 20 at %, based on the total amount of elements from the above first group, or the amount of Ni is adjusted to not less than 10 at % ad not more than 60 at % based on the total amount of elements from the above first group, whereby the saturation magnetization, coercivity and corrosion resistance can be enhanced. In view of reproducing output signal and corrosion resistance, it is preferable to arrange that the saturation magnetization of the magnetic film nearest to the information recording side be higher than that of the magnetic thin film nearest to the substrate side or that the magnetic thin film nearest to the substrate side have the highest in-plane coercivity among the magnetic films constituting the composite magnetic film. Further, in particular, the combination of these two arrangements is preferable. The constitution of the composite magnetic film of three types of magnetic thin films is further preferable, since it gives a larger degree of freedom. However, the use of five magnetic thin films or more is not preferable, since it requires too complicated a film-forming apparatus. In this case, in view of reproducing output, it is desirable to arrange the thin films such that the magnitudes of their saturation magnetizations decrease in the direction from the information recording side, and further, it is also desirable to arrange the thin films such that their in-plane coercivities increase in the direction from the information recording side. It is the most preferable to combine these two arrangements. In view of corrosion resistance, an intermediate layer may have the highest saturation magnetization. In this instance, the thickness of the magnetic thin film nearest to the information recording side, which does not exceed the thickness two times as large as that of the magnetic thin film nearest to the substrate side, is preferable for reproducibility and stability of in-plane coercivity, recording density characteristic and signal to noise ratio. Further, in particular, in order to achieve high recording density, it is preferable that the above magnetic thin film nearest to the information recording side is individually semi-hard magnetic, that a magnetic thin film adjacent to said magnetic thin film, individually, has either perpendicular magnetic anisotropy or longitudinal magnetic anisotropy, and that the in-plane coercivity of the composite film is not less than 1,000 Oe, desirably not less than 1,500 Oe. In this instance, the "semi-hard magnetic" generally stands for a case where the coercivity is not less than 50 Oe and not more than 200 Oe. The magnetic thin film nearest to the information recording side has a thickness of not less than 0.005 $\mu$m and not more than 0.1 $\mu$m, and this thickness range is desirable to enhance corrosion resistance and recording density characteristics. Further, when at least one of Fe and Bi is incorporated into the magnetic thin film nearest to the information recording side, greater magneto-optic effects, e.g. Kerr effect, Faraday effect, etc., can be obtained, and hence a greater reproducing output can be obtained in optical reproduction. Thus, the above incorporation is particularly desirable.

The magnetic thin film nearest to the information recording side is formed of a CoNi-based alloy of three or four elements selected from the previously specified materials, and the magnetic thin film nearest to the substrate side is formed of a CoCr- or CoSm-based alloy of three or four element selects from the previously specified materials. Then, particularly desirably, the crystalline orientation of the resultant magnetic thin film nearest to the information recording side is particularly high, and the signal to noise ratio in high density can be increased. In this case, in view of improvement in the orientation and magnetic characteristics, the total amount of elements selected from the previously specified third group is preferably not less than 0.5 at % and not more than 60 at %, more preferably not less than 3 at % and not more than 55 at %, most preferably not less than 10 at % and not more than 50 at %, based on the total amount of elements selected from the previously specified first group. The amount of Ni is preferably not less than 10 at % and not more than 60 at %, more preferably not less than 30 at % and not more than 50 at %, in view of magnetic characteristics. In view of corrosion resistance and achievement of high coercivity, it is preferable that at least one element selected from a fourth group consisting of Ti, Zr, Hf, Nb, Ta, Ru, Os, Rh, Pd, Al and Si is further incorporated into the magnetic thin film nearest to the substrate side in an amount of not less than 0.1 at % and not more than 20 at %, more desirably not less than 3 at % and not more than 15 at %, and that the magnetic thin film is predominantly made crystalline. It is preferable to form a nonmagnetic protective coating layer having a thickness of not less than 10 nm and not more than 40 nm on the composite magnetic film, since anti-wear reliability is improved. The nonmagnetic protective coating layer is particularly desirably formed of WC, WN, C, and the like, and an organic lubricant layer having a thickness of not less than 1 nm and not more than 15 nm may be further formed thereon. In view of corrosion resistance, it is particularly preferable to form a not less than 5 nm and nor more than 15 nm thick nonmagnetic intermediate layer of an alloy containing, as a main component, Ti, Zr, Hf, Nb or Ta, or an Ni-based alloy between the composite magnetic film and the above nonmagnetic protective coating layer.

The use, as the above-specified nonmagnetic underlayer, of a nonmagnetic material containing Cr, Mo and W or Cr-Ti, Cr-Si, Cr-Mo, etc., as a main component is preferable, since this use improves the in-plane crystalline orientation and in-plane coercivity of the magnetic thin film nearest to the substrate side. The use of a material containing Ti, C and Ge or Ti-Cr, Ti-Nb, Ti-Pt, etc., as a main component is preferable, since this use improves the perpendicular crystalline orientation of the magnetic thin film nearest to the substrate side, and finally the medium noise as a composite longitudinal medium decreases. It is preferable to carry out recording and reproducing in the above composite longitudinal magnetic recording medium by using a ring type magnetic head of which the magnetic core is at least partially formed of a ferromagnetic metal thin film, since recording and reproducing in high density can be carried out.

DETAILED DESCRIPTION OF THE PREFERRED EMBODIMENTS

There are explained corrosion resistance, magnetic characteristics and read and write characteristics in case of using a monolayer magnetic thin film.

A metal-based thin film medium can be expected to give higher read output even in high density than a coated medium. Since, however, it is made of a metal, there is a problem that it is inferior in corrosion resistance. Hence, magnetic alloy thin films having a thickness of 70 nm, obtained by incorporating 0.05, 0.1, 0.6, 1, 10, 20, 50, 60 and 70 at % of one to three elements selected from Sc, Y, La, Ce, Pr, Nd, Pm, Sm, Gd, Tb, Dy, Ho, Er, Tm, Yb, Lu, Ti, Zr, Hf, V, Nb, Ta, Cr, Mo, W, Mn, Ru, Os, Rh, Ir, Ni, Pd, Pt, Cu, Ag, Au, Al, Si, Sn, O and N to Co and $Co_{0.7}Fe_{0.3}$, were formed on glass substrates through Cr films having a thickness of 300 nm by a sputtering method under an input power density of 4 W/cm$^2$, an Ar gas pressure of 10 mTorr and a substrate temperature of 100° C. Then, C films having a thickness of 40 nm were finally formed thereon, and the resultant thin films were evaluated on corrosion resistance. In this case, among corrosions of a metal-based thin film medium, pitting corrosion leads directly to losing of data, and it is hence considered to be more critical than uniform corrosion. Thus, pitting corrosion resistance of each of these magnetic thin films was evaluated by carrying out an NaCl spray test using a salt containing 0.001 mol % of $NaNO_3$, 0.001 mol % of $Na_2SO_4$ and 1 mol % of NaCl, as a corrosion accelerating test to cause pitting corrosion.

As a result, it has been found that the corrosion resistance of magnetic alloys can be remarkably improved by incorporating into Co and Fe at least one element selected from the second group consisting of N, Tb, Mo, W, Gd, Y, Sm, Nd, Pr, Pm, Ce, Dy, La, Pt, Ir, Ti, Zr, Hf, v, Nb, Ta, Ru, Os, Rh, Pd, Al and Si. That is because these incorporated elements form a fine and dense passivation layer on the surface of a metal magnetic thin film, or because the metal alloy itself becomes electrically noble. In some cases, these two effects are found in combination. Improvement in corrosion resistance was recognized when the amount of incorporated elements was not less than 0.1 at % based on the total amount of Co and Fe. It is, however, preferable to use these elements in an amount of 0.5 at % or more. The incorporation among exceeding 30 at % is not much preferable, since the saturation magnetization is then hardly degraded. The upper limit of the above incorporation amount is not more than 30 at %, preferably not more than 20 at %.

Figure 4:
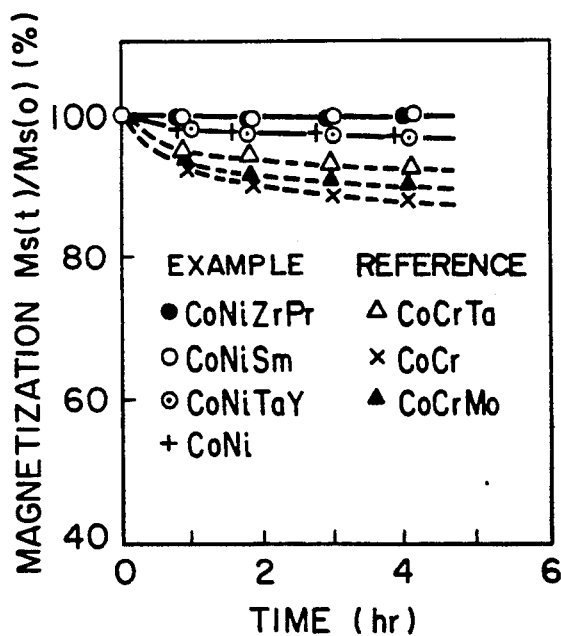
FIG. 4 shows corrosion resistance of a magnetic thin film.

In general, a magnetic material having a higher saturation magnetization is potentially superior as such. Thus, while the saturation magnetization was maintained at a constant value, various magnetic alloys were evaluated on corrosion resistance to show that Ni is particularly preferable as an element for incorporation, since Ni has not only high corrosion resistance but also magnetism. That is, the further incorporation of Ni into a magnetic alloy having the above composition can improve corrosion resistance while degradation of the saturation magnetization can be prevented, since Ni itself is a highly corrosion-resistant metal. Thus, the incorporation of Ni is particularly preferable. Namely, it has been made clear that the incorporation of not less than 10 at % of Ni gives a constant value of saturation magnetization and a corrosion resistance twice as good as that of a CoCr-based alloy such as CoCr or CoCrTa formed as Comparative Examples, as is shown in some examples in FIG. 4. However, the incorporation of not less than 60 at % of Ni is not preferable, since the coercivity decreases.

Secondly, not only magnetic recording media individually using these magnetic thin films, but also magnetic recording media using magnetic thin films of materials having inferior corrosion resistance were generally evaluated on their magnetic characteristics and read and write characteristics.

Figure 10:
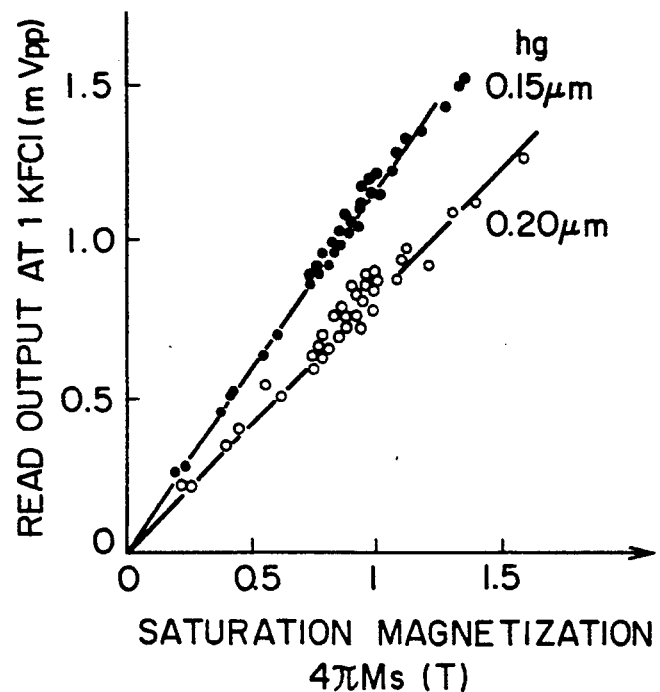
FIG. 10 shows a relationship between read output and spacing, saturation magnetization.
Figure 11:
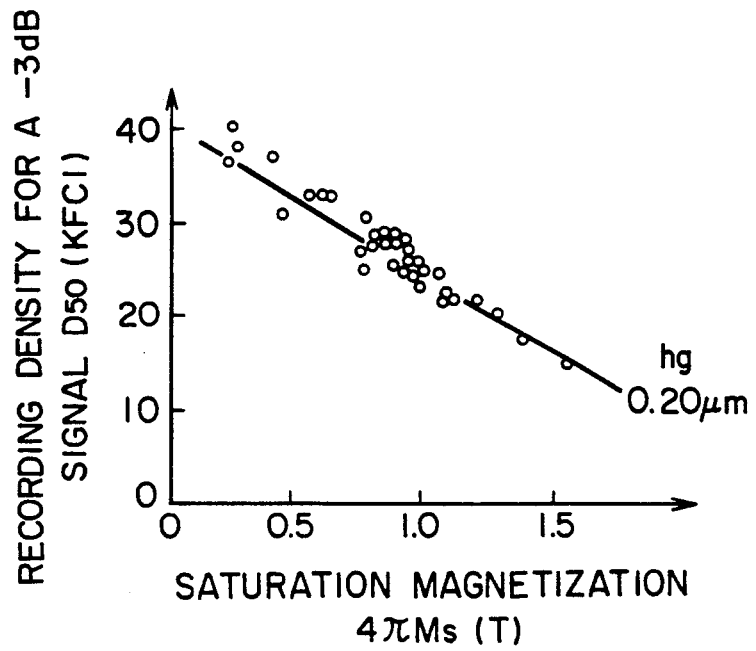
FIG. 11 shows a relationship between recording density for a −3 dB signal and saturation magnetization.

That is, magnetic disks of a monolayer magnetic thin film each was prepared by forming the above magnetic thin film having a film thickness of 60 nm and composed of CoNi alloy, CoCr alloy, CoTi alloy, CoPt alloy, CoSm alloy, CoFe alloy, CoPr alloy, CoNiZr alloy, CoNiTi alloy, CoNiPt alloy, CoNiCr alloy, CoCrPt alloy, CoCrTa alloy, CoNiZrCr alloy, CoNiHfAl alloy, or the like on a glass disk substrate or Ni-P plated Al alloy disk having a diameter of 130 φmm through a Cr film having a thickness of 420 nm, and a C protective film having a thickness of 40 nm thereon. In this case, each of the resultant media had an in-plane coercivity of not less than 300 Oe and less than 3,000 Oe, and exhibited longitudinal magnetic anisotropy. The read and write characteristics of these media were evaluated by using a metal-in-gap type ring head having a gap length of 0.6 μm and using an FeAlSi alloy in its gap portion and N-Zn ferrite in the other portions, at a relative velocity of 20 m/s and a flying height hg of 0.2 μm or 0.15 μm. As a result, it has been found that the read output at the low frequency recording time of 1 kFCI (flux change per inch) becomes greater in proportion to saturation magnetization of the magnetic thin film without depending conspicuously on the coercivity, as is shown in FIG. 10, and that the read output increases with a decreasing spacing between the head and the medium. The above result shows that the read output at the read and write time at low frequency, i.e. in low recording density can be increased by increasing the saturation magnetization of the magnetic thin film. However, if the saturation magnetization is increased, the demagnetization in the magnetic thin film increases at a write time in high density, and a problem has hence been found that with an increasing saturation magnetization, the recording density at which the output signal drops to 50% of that at low frequency of about 1 kFCI (linear recording density for a −3 dB signal $D_{50}$) decreases as shown in FIG. 11 for a case of a 0.2 μm flying height, and that the read output in a high recording density of about 40 kFCI is greatly decreased.

As discussed above, it has been recognized that since the saturation magnetization of the magnetic thin film has adverse effects on output and recording density, it is very difficult to achieve high read output and high density simultaneously even if a monolayer of the above highly corrosion-resistant magnetic alloy is used.

On the basis of the above knowledge obtained by the study of the monolayers, the present inventors decided to study a constitution which can given high coercivity and high signal to noise ratio in high density by forming a composite of magnetic thin films. In general, corrosion proceeds from the information recording side, and their study was therefore focused on read and write characteristics of composite magnetic recording media in which the magnetic thin film nearest to the information recording side was limited to a magnetic material having high corrosion resistance and longitudinal magnetic anisotropy, and the above general magnetic thin films having various compositions were formed thereunder. In this case, there have been studied cases where Cr and $Ti_{0.8}Nb_{0.2}$ alloys were used as a nonmagnetic underlayer film and the magnetic thin film nearest to the substrate side had longitudinal or perpendicular anisotropy. At first, an alloy magnetic thin film having either a smaller saturation magnetization or a greater in-plane coercivity was formed as the film nearest to the substrate side, and then, while vacuum quality, magnetic characteristics, film thickness, etc., were controlled such that no magnetic interaction took place with the above magnetic thin film and that changes such as oxidation, nitriding, etc., of the said magnetic thin film did not occur, a different alloy magnetic thin film having either a higher saturation flux density than the said magnetic thin film or a smaller in-plane coercivity than the said magnetic thin film was formed on the said magnetic thin film. When the magnetic thin films had a magnetic interaction on each other and further the magnetic thin film on the substrate side had longitudinal anisotropy, the number of in-plane coercivities which had magnetization reversal was one in any case. When the magnetic thin film on the substrate side had perpendicular anisotropy, and when the magnetic thin film on the information recording side had a coercivity of not less than 5 Oe and not more than 200 Oe and was magnetically semi-hard, the number of in-plane coercivities which had magnetization reversal to a recording filed was only one. Further, its value could be made higher than the coercivity value of the semi-hard magnetic film.

Further detailed functions of this invention will be explained hereinbelow by reference to some embodiments.

First, Table shows magnetic characteristics of typical composite magnetic media and monolayer magnetic media among the above magnetic recording media, in which the film thickness of each of the magnetic layers is 25 nm.

TABLE 1

| | No. | Constitution | Coercivity (Oe) |
|---|---|---|---|
| The invention | 1 | $C/Co_{0.55}Ni_{0.30}Pt_{0.15}/Co_{0.8}Cr_{0.2}$/substrate | 1100 |
| Comparative Example | 2 | $C/Co_{0.8}Cr_{0.2}/Co_{0.55}Ni_{0.30}Pt_{0.15}$/substrate | 760 |
| | 3 | $C/Co_{0.55}Ni_{0.30}Pt_{0.15}$/substrate | 1050 |
| | 4 | $C/Co_{0.8}Cr_{0.2}$/substrate | 300 |

Examples in Table 1 will be explained in detail hereinbelow.

It is seen that the composite medium of Example 2, which is prepared by, first, forming a CoNiPt layer on a glass substrate and then a CoCr layer thereon, has a low coercivity of 760 Oe, as compared with the 1,050 coercivity of the CoNiPt monolayer medium of Example 3. The reason therefor is considered as follows. CoCr inherently has a property that its in-plane coercivity is low as shown in Comparative Example 4, and when a CoCr layer is formed on a Co-based alloy thin film, such as CoNiPt, CoCr decreases the inherently high coercivity (shown in Tables 1 and 3) of the Co-based alloy thin film.

Figure 5:
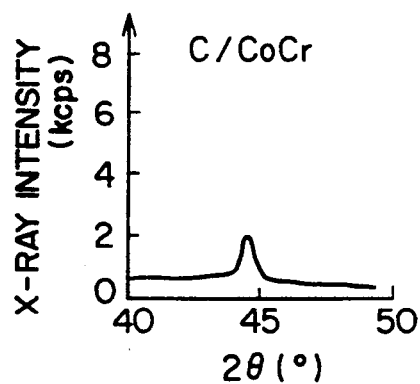
FIGS. 5, 6, 7 and 8 show orientations of CoCr, CoNiPt, CoCr/CoNiPt and CoNiPt/CoCr films
Figure 6:
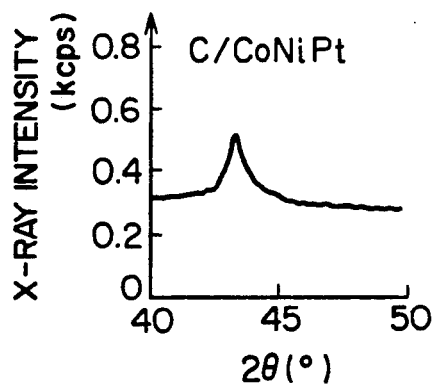
Figure 7:
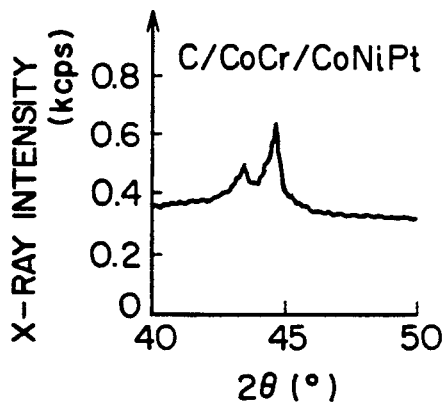
Figure 8:
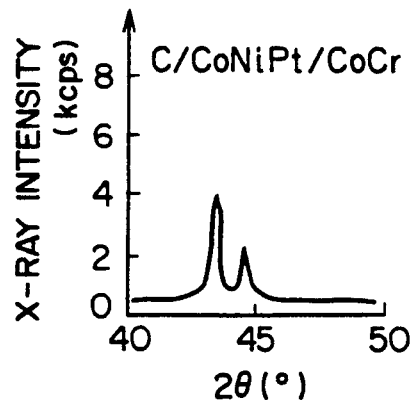
Figure 9:
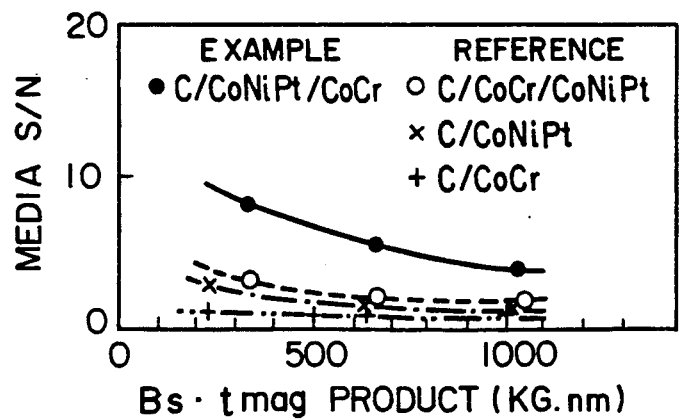
FIG. 9 shows a relationship between a medium signal to noise ratio and a medium flux of magnetic induction Bs.tmag on each of magnetic disks constituted as shown in FIGS. 5, 6, 7 and 8.

As opposed to the above, it has been made clear that the composite medium of the invention 1, which is prepared by, first, forming a CoCr layer on a substrate and then a CoNiPt layer thereon, suprisingly has a high coercivity of 1,100 Oe which is higher than the coercivity of the CoNiPt monolayer film medium of comparative Example 3. The detailed reason therefor has not yet been made clear completely However, judging from the results of X-ray analysis, etc., it is considered to be as follows. That is, when the crystalline orientations of the magnetic films of the media indicated as samples Nos. 1 to 4 in the above table 1 were examined by using X-rays, the CoCr monolayer film of comparative Example 4 exhibited an intense diffraction peak at about 44.6° in $2\theta$ as shown in FIG. 5, and its c axis was likely to be oriented perpendicularly. That is because Cr added to Co is easily segregated in grain boundary and hence Co crystalline grains are likely to undergo perpendicular c axis orientation. This effect was recognized when the amount of added Cr was not less than 0.1 at %. However, the addition of 30 at % or more of Cr is not preferable, since the saturation magnetization decreases. In contrast thereto, the CoNiPt monolayer film of comparative Example 3 exhibited only a weak diffraction at about 43.2°, which was not more than 1/10 times as small as the diffraction intensity of CoCr as shown in FIG. 6, and it has been made clear that its c axis is slightly likely to under to longitudinal orientation. Meanwhile, it has been made clear that while the CoCr-/CoNiPt/substrate composite film of Comparative Example 2 exhibits only very weak diffraction peaks, about the same as that of Comparative Example 3, in 2θ at 43.2° and 44.6° as shown in FIG. 7, the CoNiPt-/CoCr/substrate composite film of this invention 1 exhibits very intense diffractions, more than 10 times as intense as that of Comparative Example 2, at 43.2° and 4.6° as shown in FIG. 8. In this instance, in particular, the diffraction intensity at 43.2° which shows longitudinal orientation of c axis of CoNiPt is about twice as intense as the diffraction intensity at 44.6° showing perpendicular orientation of c axis of CoNiPt is about twice as intense s the diffraction intensity at 44.6° showing perpendicular orientation of c axis of CoCr, and it has been made clear that the CoNiPt film has very good crystalline orientation as a longitudinal medium. That is because the CoNiPt film easily epitaxially undergoes crystalline orientation on the above CoCr film having high perpendicular orientation ability. It has been further found that when a CoNiPt film is formed on a substrate and a thin film of CoNi-based alloy, CoSm-based alloy, or the like, other than CoCr, is further formed thereon, the resultant composite film exhibits comparatively good longitudinal crystalline orientation. On the basis of this data, it is considered that when the CoCr-based alloy thin film is formed on the CoNi-based alloy film, etc., the CoCr does not undergo good orientation since Cr of the CoCr is easily segregated as discussed above, and that the CoCr/CoNi-based alloy/-substrate composite medium hence exhibits poor magnetic characteristics. In many case, it has been shown that, in general , the c axis is a principal axis of crystalline magnetic anisotropy and that with an increase in the longitudinal orientation component of c axis, the in-plane coercivity is high and the properties as a longitudinal medium are good. For this reason, as FIG. 9 shows the results of evaluation of the read and write characteristics of the media indicated as sample Nos. 1 to 4 in Table 1 by using a thin film head having a gap length of 0.4 μm, it has been made clear that the medium of this invention causes a smaller medium noise than media having any medium magnetic flux quantity of Bs.tmag and exhibits a signal to noise ratio (S/N) not less than twice as high as that of the media of Comparative Examples. As discussed above, it has been made clear that since the magnetic thin films on the information recording side and the substrate side in the medium having the above-discussed constitution of this invention have high crystalline orientation, its coercivity is not only high but also the medium noise is small, and that the signal to noise ratio is also high.

The above effects were also recognized even by forming the magnetic thin film on the substrate side from a magnetic material containing, as a main component, a magnetic alloy containing at least one element selected from the first group consisting of Co and Fe, and at least one element selected from the third group consisting of Cu, Cr, Mo, W, Tb, Gd, Sm, Nd, Pr, Pm, Ce, Dy, Pt and Ir, or Ni. When the elements under the third group were incorporated, and when the amount thereof was 0.1 at % based on the total amount of the elements under the above first group, the above effects were recognized. That is because there elements are easily segregated in grains and/or at grain boundaries and give higher orientation. The incorporation of not less than 30 at % of these elements is not preferable since the saturation magnetization decreases.

The above effects were also recognized even by forming the magnetic thin film on the substrate side from a magnetic material containing, as a main component, a magnetic alloy containing at least one element selected from the first group consisting of Co and Fe, and at least one element selected from the third group consisting of Cu, Cr, Mo, W, Tb, Gd, Sm, Nd, Pr, Pm, Ce, Dy, Pt and Ir, or Ni. When the elements under the third group were incorporated, and when the amount thereof was 0.1 at % based on the total amount of the elements from the above first group, the above effects were recognized. That is because these elements are easily segregated in grains and/or at grain boundaries and give higher orientation. The incorporation of not less than 30 at % of these elements is not preferable, since the saturation magnetization decreases. When Ni is incorporated, its amount based on the total amount of elements of the first group is preferably not less than 10 at % and not more than 60 at % in view of improvement of magnetic characteristics such as an increase of coercivity. In any case, it is preferable to further incorporate 0.1 at %, bases on the total amount of elements of the first group, of Ti, Zr, Hf, Nb, Ta, Ru, Os, Rh, Pd, Al or Si, since the corrosion resistance is improved The incorporation of 20 at % or more of such an element is not preferable, since the magnetic characteristics are degraded. In general, the above CoMoZr and CoNiZr alloys are easily turned amorphous. When they are turned amorphous, undesirably, the above effect of crystalline orientation is lost, and the coercivity decreases to several tens Oe. It is desirable to turn the above alloys dominantly crystalline. In this case, the high orientation of the magnetic thin film on the information recording side is the most remarkably achieved when the magnetic thin film on the medium side is formed of a CoCr-based or CoSm-based three-element or four-element alloy containing at least the above metals and when the magnetic thin film on the information recording side is formed of an alloy containing, as a main component, the above CoNi-based three-element or four-element alloy. Thus, this combination is particularly preferable in view of read and write characteristics. Further, the same effect can be obtained even if one or two layers of different Co-based, Fe-based and Ni-based magnetic alloy thin films are formed between the above two magnetic thin films. Thus, the medium may be constituted of three layers or more.

The effects of high saturation magnetization of the magnetic thin film on the information recording side will be explained hereinbelow. As will be understood from spacing dependence in FIG. 10, in general, as compared with a monolayer film having an average saturation magnetization value of composite films, when the saturation magnetization quantity of the magnetic thin film on the information recording and reproducing side is made larger, the magnetization quantity at a smaller spacing position is larger, and the magnetic flux flowing into a reproducing head is larger. As a result, a relatively higher read output can be obtained. This consequently means that, in case of composite films composed of two layers, three layers or more, it is particularly preferable to make the saturation magnetization of the uppermost magnetic thin film on the information recording side the largest. As discussed previously, however, it is the most preferable in view of corrosion resistance that the upper most layer is formed of a highly corrosion-resistant magnetic layer. On the other hand, in general, when an increasing amount of elements is added to achieve higher corrosion resistance, the saturation magnetization decreases. It is hence not always necessary to make the saturation magnetization of the uppermost layer high when greatest importance is attached to corrosion resistance. In this case, however it is possible to further increase corrosion resistance and read output, as compared with a two-layer composite magnetic film, by forming a constitution in which the magnetic film is formed of three layers or more and its intermediate magnetic thin film is formed of a high saturation magnetization material. Thus, this constitution is the most preferable.

Concerning recording density, since the composite magnetic recording medium of this invention has a higher coercivity than any monolayer film medium, the length of the recorded magnetization transition is small, and its recording density can be made higher than that of any monolayer medium. Further, since the demagnetization field value at magnetization reversals at a high-density recording state is, substantially, a value of a thin film having a small saturation magnetization, the recording density can be further increased. The reason therefore is considered to be as follows. In a magnetic thin film composed of at least two materials, since irregular zigzag domains at magnetization reversals have a strong interaction on one another at a magnetic recording time, the domain structures and aizgaz domain branch amplitudes tend to be equal to one another, and the transition length, which is large when a high saturation magnetization film alone is present, becomes nearly as small as a smaller transition length, as is found when a film having a smaller saturation magnetization is present. This effect is preferable in view of domain wall energy with a decrease in the thickness of a high saturation magnetization layer. Further, with regard to gradient of head magnetic field, it is also more preferable to form a thin, high saturation magnetization film, which greatly contributes to read output, on the head side, since the head magnetic field distribution has a sharp gradient and the transition length is hence relatively small. The above effects were also recognized when the magnetic films had different compositions and components and were composed of three or more magnetic alloy layers having different saturation magnetizations.

As discussed above, an alloy magnetic thin film composed of the above-specified highly corrosion-resistant material and having a highest saturation magnetization is formed nearest to the information recording side out form a composite film. Then, the resultant composite film can have high read output and high recording density characteristics as compared with any monolayer film having a mean saturation magnetization.

Figure 12:
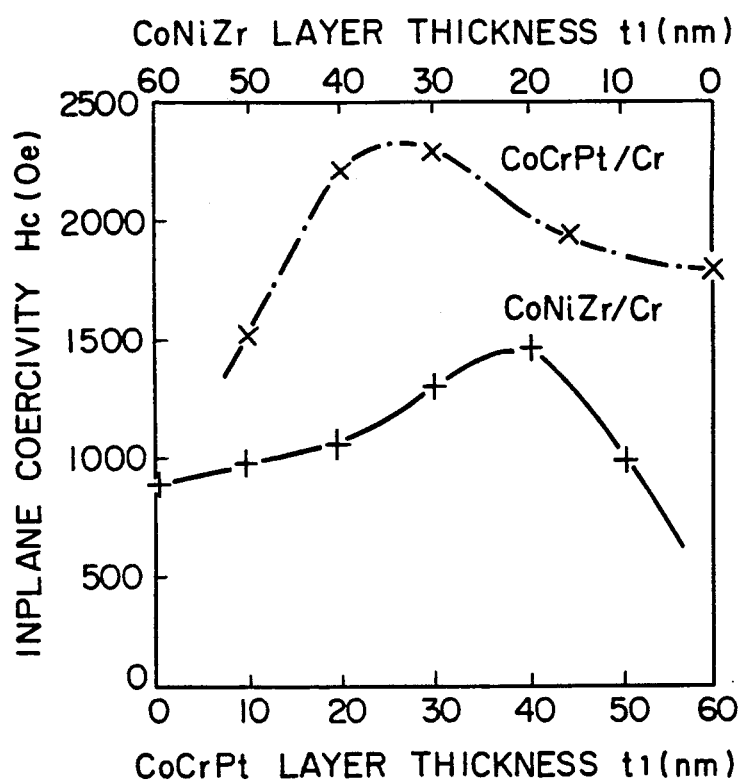
FIG. 12 shows a relationship between coercivity of a magnetic film and its film thickness.
Figure 13:
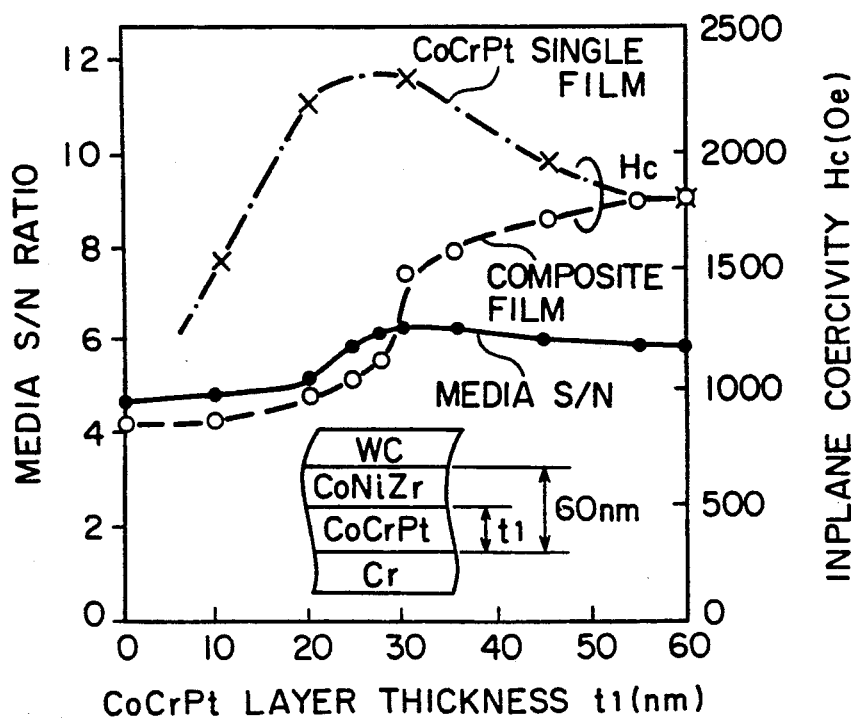
FIG. 13 shows a relationship between magnetic characteristics of read and write characteristics of a composite magnetic medium of this invention and its film thickness.

The following will further discuss the more preferable magnetic characteristics of magnetic materials for the above magnetic thin film nearest to the substrate side. At first, there will be discussed a case where the magnetic thin film has longitudinal magnetic anisotropy. By a DC magnetron sputtering method under an Ar gas pressure of 15 mTorr, input power density of 1 W/cm$^2$ and a substrate temperature of 100° C., a Cr film having a thickness of 500 nm as a nonmagnetic underlayer was formed on an NiP plated Al alloy substrate, and a $Co_{0.75}Cr_{0.10}Pt_{0.15}$ magnetic thin film having a thickness of 0, 10, 20, 25, 27.5, 30, 35, 45, 55 or 60 nm, a $Co_{0.60}Ni_{0.35}Zr_{0.05}$ magnetic thin film having a thickness of 60, 50, 40, 35, 32.5, 30 25, 15, 5 or 0 nm, a $Zr_{0.98}Hf_{0.02}$ film having a thickness of 5 nm as a nonmagnetic intermediate layer, and a WN film having a thickness of 2 nm as a nonmagnetic protective coating layer were also formed to prepare magnetic disks. Then, relationship between film thickness magnetic characteristics of a CoCrPt magnetic thin film on the substrate side and magnetic characteristics and read and write characteristics of a composite thin film medium was evaluated. In this instance, the CoCrPt and CoNiZr thin films had saturation magnetizations Ms of 790 emu/cc {4 $\pi$Ms=9.9 kG.} and 730 emu/cc {4 $\pi$Ms=0.2 kG}, respectively. Further, both the CoCrPt and CoNiZr thin films exhibited longitudinal magnetic anisotropy, and as shown in FIG. 12, media in which the CoCrPt film was formed alone. Further, the CoNiZr/CoCrPt composite films had higher in-plane coercivity than any media in which the CoNiZr was formed alone. The read and write characteristics were evaluated at a relative velocity of 12 $\mu$m/s and a flying height of 0.2 $\mu$m by using a metal-in-gap (MIG) type magnetic head having a $Co_{0.82}Nb_{0.42}Zr_{0.04}$ magnetic thin film formed in the gap portion (gap length 0.4 $\mu$m). FIG. 13 shows the coercivities and medium signal to noise ratios of the composite media and the CoCrPt monolayer medium as comparative Example. It is seen that, while the coercivities of the CoNiZr monolayer film and CoCrPt monolayer film greatly depend on film thickness, the coercivity of the composite film shows small dependence on film thickness, and is stable, with good reproducibility, against changes in film thickness and high. As discussed above, the coercivity and signal to noise ratio can be improved by forming a composite film in which the CoNiZr film is formed via the CoCrPt film. In particular, it is seen that when the thickness of the CoNiZr magnetic thin film on the information recording side is not grater than a thickness which is twice as large as the thickness of the CoCrPt magnetic thin film on the substrate side and when it is less than 40 nm (the CoCrPt film has a thickness of not less than 20 nm), media having a coercivity of not less than 1,000 Oe and a high signal to noise ratio of not less than 5 can be obtained. In this instance, when the CoCrPt magnetic thin film on the substrate side has a greater thickness than the CoNiZr magnetic thin film on the information recording side, the coercivity is high and further, the dependence on film thickness is small, which relationship is therefore particularly desirable. Further, desirably, when the coercivity is 1,500 Oe or more, the linear recording density for a −3 dB signal $D_{50}$ is also high and a relatively high medium signal to noise ratio can be obtained.

Figure 2:
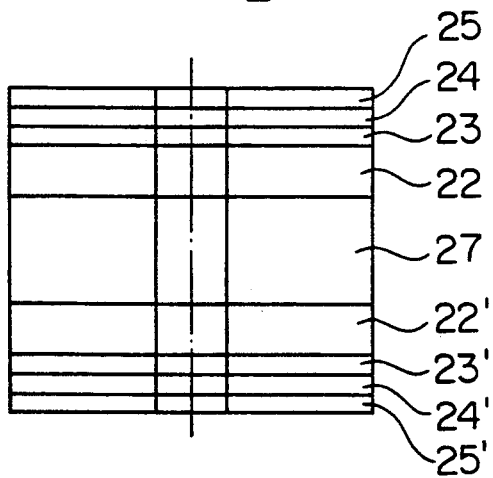
FIG. 2 is a cross sectional view of Examples 2, 3, 4 and 7 of this invention.

Further, the overwrite signal to noise ratios of all the composite magnetic films were as high as not less than 32 d/B, and these results were far better than expected from the coercivities and magnitudes of head to media spacings. As opposed thereto, the overwrite signal to noise ratio of the CoCrPt monolayer film medium having the same thickness of 60 nm was 26 dB, or badly poor as compared with the composite film media. Any sufficient explanation has not yet been obtained on a mechanism in the composite thin film medium of this invention which can give good overwrite signal to noise ratio in spite of the high coercivity of 1,000 to 1,500 Oe. However, unlike conventional common knowledge on a coated medium that a higher coercivity on the information recording side is preferable for overwrite characteristics since the recording magnetic field is intenser on the information recording head side, it is considered that the following mechanism is present. That is, as is clearly shown in FIGS. 12 and 13, the coercivity of the composite magnetic film composed according to this invention is about a mean value of the added coercivities of the magnetic thin films both on the information recording and substrate sides. In order to increase the coercivity of the composite magnetic film, in general, it is therefore sufficient to increase the coercivity of at least one of these two magnetic thin films and increase the thickness thereof. (In the interest of simplicity, any effect of a magnetic layer provided on the substrate side, as shown in FIG. 2, on improvement of characteristics is omitted here.) In the composite magnetic film of this invention the in-plane coercivity of the composite magnetic film is increased as explained above, and further, the magnetic thin films having individual constitutions are magnetically connected and at the same time undergo magnetization reversal. It is hence considered that if one of the magnetic thin films can be magnetically reversed, the other magnetic thin film(s) can be magnetically reversed as a whole even if the intra media mean value of applied magnetic field is not larger than the coercivity of the composite medium. In an ordinary magnetic filed application method for evaluation of magnetic characteristics, it is difficult to magnetically reverse only one of the thin films preferentially. However, the intensity of a head recording magnetic field exponentially decreases with an increase in distance therefrom, and therefore, the recording magnetic field in the position of the magnetic thin film on the information recording side is much intenser than that in the position of the magnetic thin film on the substrate side. As a result, when the coercivity of the magnetic thin film on the information recording side is smaller than that of the composite film, the recording magnetic field can magnetically reverse the magnetic thin film on the information recording side and the magnetic thin film strongly magnetically connected thereto on the substrate side with an effectively small magnetomotive force to record information. When the saturation magnetization of the magnetic thin film on the information recording side is high, demagnetization field has a strong influence, and this effect hence appears remarkably. As discussed above, in the composite magnetic film in which the magnetic thin films are magnetically strongly connected, it is considered that higher overwrite characteristics can be obtained when a magnetic film which has a higher coercivity when formed alone is formed on the substrate side. The same can be said concerning a composite film having a structure of three layers or more.

The nonmagnetic underlayer has been discussed on a case of using Cr therefor. However, metal alloys having a body centered cubic (bcc) structure, e.g. Cr-based alloys such as Cr-Ti, Cr-Si, etc., or Ho, W, Mo-based alloys and W-based alloys, etc., may be also used, since the use thereof can increase crystalline orientation of the magnetic film on the substrate side and give high coercivity. When the underlayer has a thickness of not less than 10 nm, an effect of achieving high coercivity is found. However, even if the thickness exceeds 500 nm, any further effect is not found, which is cost wise disadvantageous. Thus, the thickness of the underlayer is preferably not more than 500 nm.

These magnetic thin film media were left to stand in a 60° C. and 80% RH high-temperature and high-humidity atmosphere containing 0.1 ppm of $SO_2$ gas for 120 hours, and the numbers of increased missing errors were determined to evaluate their corrosion resistance. As a result, the numbers of increased errors in the CoCrPt monolayer films were more than 100. In case that a CoNiZr magnetic thin film having a thickness of not less than 5 nm was formed on the information recording side, the numbers of errors were 5 or less, and in case that a CoNiZr magnetic thin film having a thickness of not less than 15 nm was formed, any error was not found at all, and very good corrosion resistance was exhibited. If the thickness of the CoNiZr magnetic thin film on the information recording side further exceeds 100 nm, the coercivity and the linear recording density for a $-3$ dB signal $D_{50}$ undesirably decrease. The desired upper limit of the thickness is not more than 100 nm.

In this case, preferably, the corrosion resistance of the magnetic film can be improved about twice by forming a thin film having a film thickness of not less than 5 nm and composed of an alloy of at least one element selected from a group consisting of Ti, Zr, Hf, Ta and Nb or of at least one element of these into which not less than 0.01 at % and 1 at % of a platinum group element such as Pt, Pd, Rh, Ir, Ru and Os is incorporated, or a Ni-based alloy in which 27–34 wt % of Cu, 2–32 wt % of Mo, 13–25 wt % of Cr, etc., are incorporated into Ni as a nonmagnetic intermediate layer between the composite magnetic film and the nonmagnetic protective coating layer. The above film thickness exceeding 15 nm is disadvantageous in view of read and write characteristics, and said thickness is preferably not more than 15 nm, more preferably not more than 10 nm.

With respect to the nonmagnetic protective coating layer, it is preferable to use a high-hardness nonmagnetic material such as C, i-C, WC, WN, etc., in view of anti-wear strength, and preferably, its thickness of not less than 10 nm can give high anti-wear property stably. The thickness exceeding 40 nm is undesirable in view of read and write characteristics, and said thickness is preferably not more than 40 nm, more preferably 30 nm. It is preferable to further form thereon an adsorptive organic lubricant such as perfluoroalkyl polyether, etc., since the anti-wear property can be improved.

Figure 14A:
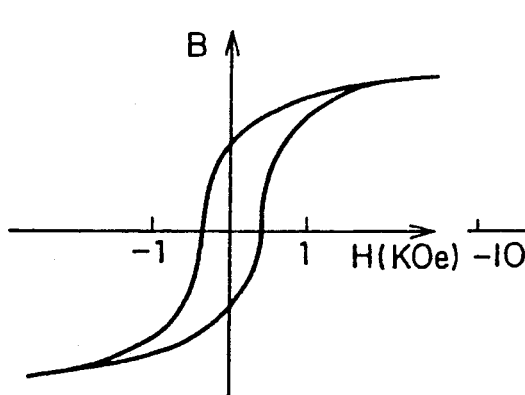
FIGS. 14(a) and 14(b) show one embodiment of magnetization curve of a medium of this invention.
Figure 14B:
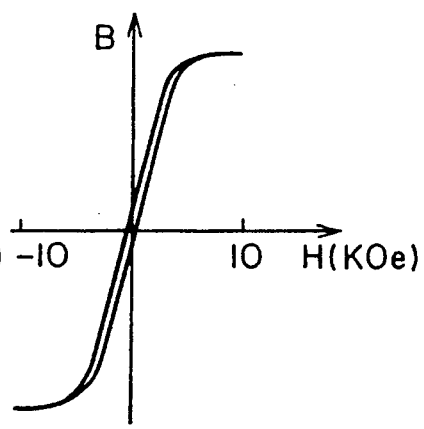

The foregoing has explained the case where the magnetic material on the substrate side has longitudinal magnetic anisotropy. The following will explain a case where the magnetic material has perpendicular magnetic anisotropy. By a RF magnetron sputtering method at a substrate temperature of 150° C., an Ar gas pressure of 5 mTorr and input power of 5W/cm$^2$, a $Ti_{0.8}Ta_{0.2}$ nonmagnetic underlayer having a thickness of 500 nm was formed on a strengthened glass substrate having a diameter of 130 mm$\phi$, and a $Co_{0.80}Cr_{0.19}Sm_{0.01}$ magnetic thin film on the substrate side having a thickness of 300 nm and perpendicular magnetic anisotropy was formed thereon. Further, a nonmagnetic thin film on the information recording side composed of a $Co_{0.80}W_{0.09}Zr_{0.11}$ amorphous magnetically semi-hard film having a coercivity, measured alone, of 30 Oe was continuously formed. Finally, a nonmagnetic intermediate layer having a thickness of 10 nm and composed of Zr, and a nonmagnetic protective coating layer having a thickness of 25 nm and composed of WN were formed to prepare a magnetic disk. When a magnetically semi-hard thin film is formed continuously on a perpendicular magnetic layer as mentioned above, these two members are magnetically connected, and further, unlike a description of Japanese Patent Kokai (Laid-open) No. 222022/1986, these two members undergo magnetization reversal, with a single high coercivity of about 350 Oe, to any of longitudinal and perpendicular magnetic fields as shown in FIGS. 14(a) and 14(b), respectively. In this instance, the magnetic thin film on the information recording side is magnetically semi-hard, if measured alone, and its in-plane coercivity is smaller than the in-plane coercivity of that magnetic thin film on the substrate side which has perpendicular magnetic anisotropy, if measured alone, as shown in Table 3. Hence, the resultant composite film has an isotropic property. When this medium is used to read and write by using the previously specified MIG type ring head, excellent overwrite characteristics can be obtained in the previously specified mechanism. Further, in the composite medium of this invention, the perpendicular magnetically anisotropic thin film on the substrate side works substantially as a longitudinal medium due to an interaction with the upper magnetically semi-hard thin film, although the mechanism has not yet been clarified, and read and write characteristics is essentially similar to that of a perpendicular magnetic recording. For this reason, the recording magnetization mode is not so much completely longitudinal as isotropic, or has many perpendicular components, and thus even for a low coercivity it is made possible to read and write in high density.

In addition, while the above embodiment uses a Ti-Ta alloy as a nonmagnetic underlayer, the same effect on improvement of perpendicular orientation of the magnetic thin film on the substrate side is found when Ti, a Ti-based alloy in which an Nb, Cr or Pt group element is incorporated into Ti, C, Ge, or the like is used. When the nonmagnetic underlayer has a thickness of not less than 10 nm, the above effect can be obtained. However, even if the thickness exceeds 500 nm, any further effect cannot be expected, and the cost therefor is a problem on the contrary. Thus, it is preferable that the thickness thin film on the substrate side, composed of CoPt, CoFePt, CoCrPt, or the like, 13 and 13' each indicates a magnetic thin film on the information recording side, having a higher saturation magnetization than 12 and 12' and composed of CoNiZr, CoNiSm, CoNiPr, or the like, 14 and 14' each indicates a nonmagnetic protective coating layer of C, WC, WN, TiN, ZrH, HfN, TiC, ZrC, HfC, or the like. The following is a detailed explanation of this Example.

By a DC magnetron sputtering method at a substrate temperature of 150° C., an Ar gas pressure of 10 mTorr and an input power density of $2W/cm^2$, $Co_{0.79}Cr_{0.20}Ta_{0.01}$ films 12, 12' having a saturation magnetization Ms of 560 emu/cc $\{4\pi Ms=7.0 kG\}$ in a thickness of 20 nm were formed on an Al alloy substrate plated with 10 nm thick Ni-P, having a surface polished such that grooves and/or scars were formed and a circumferential center line average height was 10 nm and having an outer diameter of 130 mm$\phi$, and then, continuedly, $Co_{0.59}Ni_{0.26}Pt_{0.15}$ films 13, 13' $\{4\pi Ms=1.1 kG\}$ having a thickness of 20 nm were formed thereon. Finally, C films 14, 14' having a thickness of 30 nm were formed to give a magnetic disk. A 2 nm thick film of perfluoroalkyl polyether having a polar group of -OH was formed on the magnetic disk, and its read and write characteristics were evaluated by using a metal-in-gap type ring head having a gap length of 0.4 $\mu$m and having an FeAlSi alloy thin film in the gap portion at a relative velocity of 20 m/s and 9 MHz (recording density D=23 kFCI), to show excellent read and write characteristics that, as shown in Table 2, the output $E_{2F}$ was high as compared with films formed under the same conditions as Comparative Examples. Further, the medium of this invention also exhibited low noise, e.g. smaller than half of that of Comparative Example 1 in which a CoCr-based alloy was used as an upper layer, and it exhibited a very high value as a medium signal to noise ratio.

TABLE 2

| | Constitution | In-plane coercivity Hc// (Oe) | Perpendicular coercivity Hc⊥ (Oe) | Output $E_{2F}$ (mVpp) |
|---|---|---|---|---|
| Example 2 | C/CoNiPt/CoCrTa/substrate | 1050 | 455 | 0.42 |
| Comparative Example 5 | C/CoCrTa/CoNiPt/substrate | 738 | 480 | 0.35 |
| Comparative Example 6 | C/CoNiPt/substrate | 1019 | 469 | 0.23 |
| Comparative Example 7 | C/CoCrTa/substrate | 313 | 225 | 0.13 | is not less than 500 nm. When information is read out from these magnetic recording media, a ring type magnetic head using a metal magnetic thin film at least in part of the magnetic circuit may be used, or magneto-optical effects such as Kerr effect, Faraday effect, etc., may be used. In the latter case, it is preferable to incorporate at least one of Bi and Fe into the first magnetic thin film, since the incorporation thereof particularly increases the above magneto-optical effects.

It is particularly preferable that the use of the above magnetic recording medium and magnetic read and write method can provide small-sized high-capacity magnetic memory units.

EXAMPLE 1

Figure 1:
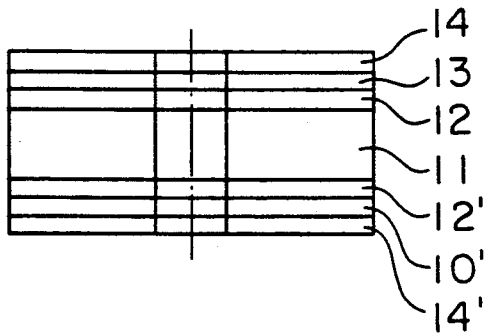
FIG. 1 is a cross sectional view of Examples 1 and 6 of this invention.

Example 1 of this invention will be explained hereinbelow by referring to FIG. 1, in which 11 indicates a nonmagnetic substrate such as a strengthened glass substrate, NiP plated Al alloy substrate, plastic substrate, or the like, 12 and 12' each indicates a magnetic In addition, as is also shown in Table 2 above, the CoCrTa film which was as thin as about 20 nm had a small coercivity in the perpendicular direction, and had magnetically longitudinal orientation in spite of major crystalline orientation. When the thickness was not more than 150 nm, like magnetic orientation was found. According to magnetization curves, all the composite magnetic films had high coercivities. However, when the disk under preparation was left to stand in an argon gas for about one hour between formation of the magnetic thin film on the substrate side and formation of the magnetic thin film on the information recording side, or when the upper magnetic film was formed through a nonmagnetic intermediate layer 15 having a thickness of about 10 nm, a snake-form magnetization curve was obtained, and magnetization reversal did not take place with a single coercivity. Further, when the CoCrTa film had a thickness of not less than 200 nm to impart perpendicular magnetic anisotropy, no magnetization reversal took place with a single coercivity, since the coercivity of the CoNiPt was as high as 1,000 Oe. In such media, read waveforms were not only complicated but also their recording density characteristics were poor.

To compare Example with Comparative Examples, the coercivity of the magnetic thin film on the information recording side changes depending upon a state of the underlayer, and the coercivity of each of the magnetic thin films in the composite magnetic film differs from that of such a magnetic thin film simply formed on an under substrate. Even when the film thicknesses of the CoNiPt and CoCrTa were equally 40 nm, 60 nm or 80 nm, the completely same result was obtained. Further, like effects were found both when, concerning the CoCrTa alloy, the proportion of Cr was changed to 12 at %, 15 at % or 23 at % with maintaining a constant proportion of Ta while the 4 $\pi$Ms was changed to 8.0 kG, 6.3 kG or 2.4 kg, and when, concerning the CoNiPt alloy, the 4 $\pi$Ms was changed to 9.0, 8.7 or 8.4 kG with the 30 at % proportion of Ni and the 5 at %, 10 at % or 20 at % proportion of Pt.

EXAMPLE 2

Example 2 of this invention will be explained hereinbelow by referring to FIG. 2, in which 21 indicates a nonmagnetic substrate such as a strengthened glass coated with a resin on the surface, Ti alloy, Ni-P plated Al alloy, or the like, 22 and 22' each indicates a nonmagnetic underlayer of Ti, a Ti alloy, Cr, a Cr alloy, Mo, an Mo alloy, c, Ge, or the like, 23 and 23' each indicates a magnetic thin film on the substrate side in this invention, composed of CoCr, CoMo, CoW, CoTi, CoNiSm, CoCrTi, CoCrZr, CoCrAl, CoCrSi, CoSm, or the like, 24 and 24' each indicates a magnetic thin film on the information recording side, composed of CoNbZr, CoTaZr, CoWZr, CoNiZr, CoFeTa, CoNbHf, CoTaHf, CoTaMo, CoMoZr, CoMoHf, or the like, and 25 and 25' each indicates a nonmagnetic protective thin film composed of C, Rh, SiO$_2$, ZrO$_2$, Al$_2$O$_3$, or the like. In addition, only an organic lubricant film may be formed without forming the nonmagnetic protective film. This Example will be explained further in detail hereinbelow.

By a DC magnetron sputtering method at a substrate temperature of 100° C., a 99.999% purity Ar gas pressure of 15 mTorr and an input power density of 1 W/cm$^2$, 250 nm thick Ti$_{0.82}$Nb$_{0.18}$ alloy nonmagnetic under layers 22, 22' were formed on a nonmagnetic substrate 21 in which a UV-curable resin having circumferential grooves of 8 nm depth at a center line average surface height was formed on a 1 mm thick Al alloy disk and which had a diameter of 89 mm$\phi$, then 250 nm thick magnetic thin films 23, 23' on the substrate side, composed of Co$_{0.80}$Cr$_{0.19}$Zr$_{0.01}$ and having a saturation magnetization Ms of 560 emu/cc {4 $\pi$Ms=7 kG}, were formed thereon, and continuedly, 30 nm thick magnetic thin films 24, 24' on the information recording side, composed of Co$_{0.79}$Mo$_{0.11}$Zr$_{0.10}$ and having a saturation magnetization Ms of 700 emu/cc {4 $\pi$Ms=8.8 kG}, were formed thereon. Then, finally, 20 nm thick Al$_2$O$_3$ nonmagnetic protective coating layers 25, 25' were formed to give a magnetic disk. A head magnetic field was applied to this magnetic disk to show a single magnetization curve in which the in-plane and perpendicular coercivities Hc || and Hc$\perp$ were 363 and 369 Oe, respectively. The in-plane and perpendicular magnetization curve was like those shown in FIG. 14. A 3 nm thick adsorptive film of perfluoroalkyl polyether was formed on this magnetic disk by a dipping method, and when its read and write characteristics were evaluated by using an MIG head having a gap length of 0.3 $\mu$m (a composite type magnetic head of which the portion in the vicinity of the gap was formed of an Fe-Al-Si alloy, etc.) in a contact state, a high read output was obtained as compared with Comparative Example in which CoCrZr and CoMoZr were formed in a reverse order but in the same method, as is shown in Table 3. The CoMoZr here was amorphous.

TABLE 3

| | Constitution | In-plane coercivity Hc// (Oe) | Perpendicular coercivity Hc$\perp$ (Oe) | Read waveform | Output E$_{2F}$ (mVpp) |
|---|---|---|---|---|---|
| Example 3 | Al$_2$O$_3$/CoMoZr/CoCrZr/TiNb | 363 | 369 | in-plane | 0.30 |
| Comparative Example 8 | Al$_2$O$_3$/CoCrZr/CoNiZr/TiNb | 94 | 373 | perpendicular | 0.20 |

In addition, when only CoMoZr is formed directly on a substrate on which TiNb was formed, the in-plane and perpendicular coercivities are 25 and 110 Oe, respectively, and the CoMoZr shows itself to be magnetically semi-hard. In general, however, since coercivity values may greatly vary depending upon a state, etc., of an under layer film, it is difficult to accurately understand the magnetic characteristics of CoMoZr in case that CoMoZr is formed on the CoCrZr as in Example. Further, when CoCrZr was formed directly deposited on the substrate, the in-plane and perpendicular coercivities Hc || and Hc$\perp$ were 240 and 370 Oe, respectively, and the CoCrZr in Example showed perpendicular anisotropy. In this case, as shown in this Example, the magnetic thin films 23, 23' on the substrate side and the magnetic thin films 24, 24' on the information recording side are formed of a magnetic alloy containing Co as a main component such that these members are magnetically connected without any intervenient nonmagnetic layer such as an oxidation layer in the interface. Then, the composite magnetic thin film can be made longitudinally magnetic, although magnetic thin films 24, 24' are perpendicular magnetic films. The smaller the perpendicular coercivity of the perpendicular magnetic film is and the smaller its thickness is, the more remarkable this effect is, and this effect is based on strong exchange coupling in films containing Co as a main component.

The CoCrZr film gave a like result when its thickness was 0.15 $\mu$m, 0.2 $\mu$m, 0.3 $\mu$m and 0.5 $\mu$m, and the CoMoZr film gave high read outputs at a high recording density when its thickness was 20 nm, 40 nm, 60 nm and 80 nm. A like effect was also found when a Ti-based alloy such as Ti-Cr, Ti-Ta, or the like, Ti, C or Ge was substituted for TiNb. The above effect was also obtained when the CoCrZr was replaced with a perpendicular magnetic film such as CoCr, CoMo, CoW, CoTi, CoSi, CoAl, CoSm, NdFeB, PrFeB, or the like as a magnetic thin film on the substrate side. Further, a like effect was also found when the CoMoZr as a magnetic thin film on the information recording side was replaced with a magnetic alloy which has a higher saturation magnetization than the above perpendicular magnetic film and is magnetically semi-hard in an amorphous state, such as CoNbZr, CoTaZr, CoFeTa, CoWZr, or the like. These are magnetically semi-hard or soft-magnetic, and have not been hitherto used in any magnetic recording medium. In addition, a study was also made of cases where three or four layers of the magnetic thin films were alternately formed on the substrate and information recording sides. However, no improvement of characteristics was found. Further, when four or five layers of magnetic thin films on the substrate side and $SiO_2$ nonmagnetic films were also alternately formed, any effect was not found, either

EXAMPLE 3

Example 3 will be explained by referring to FIG. 2, in which 21 indicates a nonmagnetic substrate such as a strengthened glass coated with glass on the surface, an organic resin, Ni-P plated Al alloy, or the like, 22 and 22' each indicates nonmagnetic underlayer of Cr, Cr-Si, Cr-Ti, Mo-Si, Mo-Ti, or the like, 23 and 23' each indicates a magnetic thin film on the substrate side, composed of CoNiSm, CoCuSm, CoNiPr, CoNiIr, CoNiPtAl, CoNiTi, CoNiPt, CoNiCr, CoTa, CoCrTaSi, CoCrPt, or the like, 24 and 24' each indicates a magnetic thin film on the information recording side, composed of NiFe, Ni/FeMo, GdFeCoPt, GdBiFeCo, TbFeCo, CoTaZr, or the like, and 25 and 25' each indicates a nonmagnetic protective coating layer of C, i-C, WN, TiN, WC, ZrCN, HFCN, HfN, or the like. This Example will be explained further in detail hereinbelow.

The nonmagnetic substrate 21 was prepared by plating 15 μm thick Ni-P on an Al alloy substrate having a thickness of 1.9 mm and a diameter of 133 mmφ and polishing the surface thereof such that circumferential grooves and/or irregular scars were formed at a center line average height of 8 nm, and by an RF magnetron sputtering method at a substrate temperature of 120° C., an Ar gas pressure of 15 mTorr and an input power density of 1 W/cm², 400 nm thick Cr nonmagnetic under layers 22, 22'were formed thereon, and then 55 nm thick magnetic thin films 23, 23, on the substrate side, composed of $Co_{0.71}Cr_{0.14}Pt_{0.15}$ and having a saturation magnetization Ms of 700 emu/cc {4 $\pi$Ms=8.8 kG} and a longitudinal magnetic anisotropy, were formed thereon. Further, continuedly, 26 nm thick magnetic thin films 24, 24' on the information recording side, composed of $Co_{0.92}Ta_{0.04}Zr_{0.04}$ and having a saturation magnetization Ms of 1,200 emu/cc {4 $\pi$Ms=15 kG} and longitudinal anisotropy, were formed thereon at an input power density of 0.5 W/cm², and finally, 25 nm thick ZrCN films 25, 25' as a nonmagnetic protective coating layer were formed to give a magnetic disk. This magnetic disk showed magnetization reversal to a longitudinal magnetic field at a magnetic field of 1,200 Oe (a single coercivity: 1,200 Oe). In addition, when the magnetic thin films on the substrate and information recording sides were respectively formed directly on the Cr film, they had longitudinal magnetic anisotropy individually, and they were longitudinal magnetic films having a coercivity of 1,600 or 600, respectively. Further, a 4 nm thick perfluoroalkyl polyether having an ester group was formed on this magnetic disk by a dipping method, and the disk was set in a magnetic disk unit having an MIG head having a gap length of 0.4 μm and a flying height of 0.18 μm, to evaluate its read and write characteristics. The resultant read output in a high density of 40 kFCI was about 1.2 times as high as those of Comparative Example wherein the magnetic thin film on the substrate side and the magnetic thin film on the information recording side were reversely formed and Comparative Example wherein only a monolayer was formed, and the resultant memory unit had a unit capacity not less than 1.2 times as high as that of any conventional memory unit. The CoTaZr film had corrosion resistance not less than twice as high as that of the CoCrPt film, and this Example showed corrosion resistance about twice as high as that of the CoNiZrCr monolayer film.

Like effects were found when the magnetic thin films on the substrate and information recording sides were respectively formed of CoCrSm and CoNiZr or CoCrTaSi and CoNiZr. Further, like effects were also found when the layers were formed of CoNiZr-based alloys and the compositions of the two magnetic thin films were selected such that the magnetic thin film on the information recording side had a higher saturation magnetization.

EXAMPLE 4

The following will explain, as another example, Example 4 constituted in the same way as in Example 3. By a DC magnetron sputtering method at a substrate temperature of 80° C., an Ar gas pressure of 10 mTorr in which the Ar gas contained 0.05 vol % of $O_2$, and an input power density of 1.5 W/cm², 300 nm thick $Cr_{0.7}Ti_{0.3}$ nonmagnetic underlayers 22, 22' were formed on a strengthened glass substrate 21 having a thickness of 1.2 mm and a diameter of 51 mmφ, and then 50 nm thick magnetic thin films 23, 23' on the substrate side, composed of $Co_{0.5}Ni_{0.3}Zr_{0.05}Cr_{0.15}$ and having a saturation magnetization Ms of 300 emu/cc {4 $\pi$Ms=3.8 kG}, were formed thereon. Further, continuedly, magnetic thin films 24, 24', having a thickness of 30 nm and a saturation magnetization Ms of 500 emu/cc {4 $\pi$Ms=7.3 kG} and composed of $Tb_{0.18}Fe_{0.67}Co_{0.10}Nb_{0.05}$, having a thickness of 30 nm and a saturation magnetization Ms of 600 emu/cc {4 $\pi$Ms=7.5 kG} and composed of $Gd_{0.17}Fe_{0.68}Co_{0.11}Nb_{0.04}$, or having a thickness of 30 nm and a saturation magnetization Ms of 800 emu/cc {4 $\pi$Ms=10 kG} and composed of $Ni_{0.8}Fe_{0.2}$ were formed thereon to give magnetic disks. These magnetic disks showed magnetization curves in which the in-plane coercivities were single coercivities of 500, 600 and 300 Oe, respectively, which showed that the magnetic thin films on the substrate and information recording sides in each disk were strongly magnetically connected. When no magnetic thin film was formed on the substrate side unlike these magnetic disks, the resultant in-plane coercivities were 200, 300 and 50 Oe, respectively. Further, when each of these magnetic disks was set in a magnetic disk memory unit, used for writing with an Mn-Zn ferrite ring head and read by means of a laser diode and Kerr effect, signal to noise ratios not less than 5 times as high as that obtained when read by means of a ring head were obtained in a high recording density of about 100 Mb/in². A further study was made of a case where $Co_{0.92}Ta_{0.04}Zr_{0.04}$ was used as a magnetic thin film on the information recording side. In this case, the incorporation of at least one of Fe and Bi is more preferable since it gives a three times higher signal to noise ratio.

EXAMPLE 5

Figure 3:
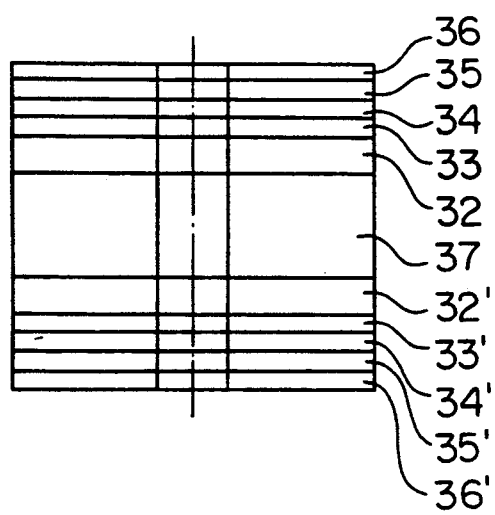
FIG. 3 is a cross sectional view of Example 5 of this invention.

Example 5 as as further another example will be explained by referring to FIG. 3, in which 31 indicates a nonmagnetic substrate of a strengthened glass, Al alloy of which the surface was treated with alumilite, Ti-Mg alloy, or the like 32 and 32' each indicates a nonmagnetic underlayer of Ti, Ti-Nb alloy, Ti-Ta alloy, Cr, Cr-Ti alloy, or the like, 33 and 33' each indicates a magnetic thin film on the substrate side, composed of a magnetic alloy of CoCr, CoCrTa, CoCrSi, CoTi, CoMo, CoW, CoNiZrCr, CoCrSm, CoPtSm, or the like, and 34 and 34' each indicates an intermediate magnetic thin film composed of a magnetic alloy of CoNiCr, CoNiZr, CoNi, CoFeZr, FeCoNi, CoFePt, CoPt, CoNiPt, CoCrPt, NdFeB, SmCo, CoPr, CoCe, CoGd, CoY, CoNd, CoPm, CoDy, CoLa, CoIr, CoTi, CoZr, CoHf, CoV, CoNb, CoTa, CoRu, CoOs, CoRh, CoPd, CoAl, CoSi, or the like. In this case, it is preferable that the intermediate magnetic layer has a higher saturation magnetization than the magnetic thin film on the substrate side. Further, 35 and 35' each indicates a magnetic thin film on the information recording side, composed of a magnetic alloy of CoNiZr, CoTaZr, CoTaHf, CoNbTa, CoNbTi, CoNbZr, CoNbHf, CoTaMo, CoNbMo, CoZrMo, CoZrW, CoHfMo, or the like, and 36 and 36' each indicates a nonmagnetic protective coating layer of WC, WN, WCN, HfC, HfN, NbN, NbC, NbCN, C, i-C, $ZrO_2$, TaC, TaN, TaCN, or the like.

This Example will be explained further in detail circumferential grooves and/or irregular scars of a center line average height of 6 nm was prepared by plating 12 μm thick Ni-P on an Al alloy substrate having o a thickness of 2.5 mm and a diameter of 220 mmφ, and polishing its surface so as to form grooves and/or irregular scars, and by a DC magnetron sputtering method at a substrate temperature of 150° C., an Ar gas pressure of 10 mTorr and an input power density of 3 W/cm$^2$, 500 nm thick $Cr_{0.8}Ti_{0.2}$ underlayers 32, 32' were formed thereon. Then, 40 nm thick magnetic thin films 33, 33' on the substrate side, having a saturation magnetization of 800 emu/cc {4 $\pi$Ms=10 kG} and composed of $Co_{0.78}Cr_{0.10}Ta_{0.02}Ta_{0.02}Pt_{0.10}$ were formed thereon at an input power density of 2 W/cm$^2$. Then, continuedly, intermediate magnetic thin films 34, 34' having a thickness of thickness of 30 nm and saturation magnetization Ms of 1,040 emu/cc {4 $\pi$Ms=13 kG} and composed of $Co_{0.78}Ni_{0.2}Cr_{0.02}$ were formed at an input power density of 1.5 W/cm$^2$, and further continuedly, magnetic thin films 35, 35' on the information recording side, having a thickness of 20 nm and saturation magnetization Ms of 1,200 emu/cc {4 $\pi$Ms=15 kG} and composed of $Co_{0.9}$. $_2Ta_{0.05}Zr_{0.03}$ were formed at an input power density of 1.0 W/cm$^2$. Then, finally, 30 nm thick nonmagnetic protective coating films 36, 36' of WN were formed at an input power density of 3 W/cm$^2$. This disk was dipped in Freon containing perfluoroalkyl polyether having a adsorptive terminal group to form a lubricant layer, thereby a magnetic disk was obtained. When this magnetic disk was evaluated for magnetic characteristics, it was found that it showed magnetization reversal with a single coercivity of 1,100 Oe. In addition, the CoNiCr or CoTaZr monolayer medium had a coercivity of 1,000 or 600 Oe. The same eight magnetic disks as this magnetic disk and 32 thin film magnetic heads having a gap length of 0.4 μm were combined as a magnetic disk unit, and its read and write characteristics were evaluated by comparing it with media of Comparative Examples each of which was formed of a CoCrTaPt, CoNiCr or CoTaZr monolayer film and had the same magnetic flux quantity (product of saturation magnetic flux density and film thickness) as that of this Example. The result was that the unit of this Example gave a read output 1.2, 1.3 or 1.3 times as high as that of Comparative Example in a high recording high as 100–120 Mb/in$^2$. Thus, there were obtained a high-performance magnetic disks and a high-capacity magnetic memory units as compared with any prior art products.

EXAMPLE 6

Magnetic tapes were prepared by forming a magnetic thin film to be on the substrate side, a magnetic thin film to be on the information recording side and a nonmagnetic protective coating layer on an organic nonmagnetic substrate of Upilex ®, polyimide, or the like in the same way as in Example 1. A combination of each of these magnetic tapes with a magnetic head in which a magnetic core was formed by using a metal magnetic thin film on a nonmagnetic substrate was used in VTR or a magnetic memory unit for back-up, to show that the obtained capacity was 1.2–1.5 times as high as those of conventional media. Further, corrosion resistance not less than twice as high as those of conventional metal tapes was obtained.

EXAMPLE 7

Magnetic disks having magnetic thin films shown in Table 4 were produced under the same conditions as in Example 3.

TABLE 4

| | Magnetic thin film on the substrate side | Magnetic thin film on the information recording side |
|---|---|---|
| 4 | $Co_{0.61}Ni_{0.35}Zr_{0.04}$ | $Co_{0.78}Cr_{0.11}Pt_{0.11}$ |
| 5 | " | $Co_{0.85}Cr_{0.13}Pt_{0.02}$ |
| 6 | " | $Co_{0.77}Mo_{0.10}Pt_{0.12}Nb_{0.01}$ |
| 7 | " | $Co_{0.77}W_{0.10}Pt_{0.12}Si_{0.01}$ |
| 8 | " | $Co_{0.84}Cr_{0.15}Tb_{0.01}$ |
| 9 | " | $Co_{0.76}Cr_{0.11}Gd_{0.01}Pt_{0.12}$ |
| 10 | " | $Co_{0.76}Cr_{0.11}Sm_{0.01}Pt_{0.12}$ |
| 11 | " | $Co_{0.76}Cr_{0.11}Nd_{0.01}Pt_{0.12}$ |
| 12 | " | $Co_{0.76}Cr_{0.11}Pm_{0.01}Pt_{0.12}$ |
| 13 | " | $Co_{0.76}Cr_{0.11}Pr_{0.01}Pt_{0.12}$ |
| 14 | " | $Co_{0.76}Cr_{0.11}Ce_{0.01}Pt_{0.12}$ |
| 15 | " | $Co_{0.76}Cr_{0.11}Dy_{0.01}Pt_{0.12}$ |
| 16 | " | $Co_{0.76}Cr_{0.11}Ir_{0.01}Pt_{0.12}$ |
| 17 | " | $Co_{0.80}Sm_{0.18}Cu_{0.02}$ |
| 18 | " | $Co_{0.80}Nd_{0.18}Cu_{0.02}$ |
| 19 | " | $Co_{0.70}Ni_{0.20}Cr_{0.10}$ |
| 20 | " | $Co_{0.70}Ni_{0.20}Mo_{0.10}$ |
| 21 | $Co_{0.64}Ni_{0.35}Pr_{0.01}$ | $Co_{0.76}Cr_{0.11}Pt_{0.12}Ta_{0.01}$ |
| 22 | $Co_{0.64}Ni_{0.35}Y_{0.01}$ | " |
| 23 | $Co_{0.64}Ni_{0.35}Sm_{0.01}$ | " |
| 24 | $Co_{0.64}Ni_{0.35}Nd_{0.01}$ | " |
| 25 | $Co_{0.64}Ni_{0.35}Pm_{0.01}$ | " |
| 26 | $Co_{0.64}Ni_{0.35}Ce_{0.01}$ | " |
| 27 | $Co_{0.64}Ni_{0.35}Dy_{0.01}$ | " |
| 28 | $Co_{0.64}Ni_{0.35}La_{0.01}$ | " |
| 29 | $Co_{0.64}Ni_{0.31}Ti_{0.05}$ | " |
| 30 | $Co_{0.64}Ni_{0.31}Hf_{0.05}$ | " |
| 31 | $Co_{0.64}Ni_{0.31}V_{0.05}$ | " |
| 32 | $Co_{0.64}Ni_{0.31}Nb_{0.05}$ | " |
| 33 | $Co_{0.64}Ni_{0.31}Ta_{0.05}$ | " |
| 34 | $Co_{0.64}Ni_{0.31}Ru_{0.05}$ | " |

All the magnetic disks had magnetization reversal with a high single coercivity and exhibited a high medium signal to noise ratio in a high density of about 40 kFCI as compared with a case where no magnetic thin film on the substrate side was formed.

EXAMPLE 8

Magnetic disks having magnetic thin films shown in Table 5 were produced under the same conditions as in Example 4.

TABLE 5

| | Magnetic thin film on the substrate side | Magnetic thin film on the substrate side |
|---|---|---|
| 35 | $Co_{0.59}Ni_{0.40}Os_{0.01}$ | $Co_{0.84}Cr_{0.14}Ta_{0.02}$ |
| 36 | $Co_{0.59}Ni_{0.40}Rh_{0.01}$ | " |
| 37 | $Co_{0.59}Ni_{0.40}Pd_{0.01}$ | " |
| 38 | $Co_{0.60}Ni_{0.35}Al_{0.05}$ | " |
| 39 | $Co_{0.60}Ni_{0.35}Si_{0.05}$ | " |
| 40 | $Co_{0.59}Fe_{0.10}Ni_{0.30}N_{0.01}$ | " |
| 41 | $Co_{0.61}Ni_{0.35}Zr_{0.04}$ | $Co_{0.78}Cr_{0.10}Pt_{0.10}Ti_{0.02}$ |
| 42 | " | $Co_{0.78}Cr_{0.10}Pt_{0.10}Zr_{0.02}$ |
| 43 | " | $Co_{0.78}Cr_{0.10}Pt_{0.10}Hf_{0.02}$ |
| 44 | " | $Co_{0.78}Cr_{0.10}Pt_{0.10}Ru_{0.02}$ |
| 45 | " | $Co_{0.78}Cr_{0.10}Pt_{0.10}Os_{0.02}$ |
| 46 | $Co_{0.60}Ni_{0.35}Zr_{0.03}Si_{0.02}$ | $Co_{0.78}Cr_{0.10}Pt_{0.10}Rh_{0.02}$ |
| 47 | $Co_{0.60}Ni_{0.35}Zr_{0.04}Al_{0.01}$ | $Co_{0.78}Cr_{0.10}Pt_{0.10}Pd_{0.02}$ |
| 48 | $Co_{0.60}Ni_{0.35}Zr_{0.04}Mo_{0.01}$ | $Co_{0.78}Cr_{0.10}Pt_{0.10}Al_{0.02}$ |

All the magnetic disks had magnetization reversal with a high single coercivity and exhibited a high medium signal to noise ratio in a high density of about 37 kFCI as compared with a case where no magnetic thin film on the substrate side was formed. These disks also had good corrosion resistance and their areal recording densities were as high as 150 to 300 Mb/in$^2$. Thus, ultra high-capacity small-sized disk units were obtained.

This invention has an effect on production of high capacity and small-sized magnetic memory units, since this invention gives a medium having higher crystalline orientation than any conventional medium and since this invention makes it possible to achieve an output at least 1.2 times as high as that of any conventional medium in high recording density and gives a low noise medium. This invention also has an effect on improvement of anti-wear reliability, since a recording density as high as that of any conventional medium can be achieved even if the flying height of a magnetic head is increased. Further, this invention can widen the usable compositions of magnetic films and the range of materials and hence has an effect on remarkable improvement of read and write characteristics and corrosion resistance, etc., since this invention makes it possible to utilize magnetically semi-hard materials which had a high saturation magnetization and corrosion resistance but a small coercivity and hence were not usable in a conventional magnetic recording medium.

What is claimed is:

1. A longitudinal magnetic recording medium comprising a composite magnetic film formed on a nonmagnetic substrate directly or through a nonmagnetic underlayer, in which all of the magnetic thin metal films constituting the composite magnetic film are magnetically coupled so as to have a single in-plane coercivity, and the in-plane coercivity is greater than the in-plane coercivity of a longitudinal magnetically anisotropic magnetic thin film constituting a magnetic thin metal film nearest to an information recording side among the magnetic thin metal films constituting the composite film.

2. A longitudinal magnetic recording medium according to claim 1 wherein the magnetic thin metal film nearest to the information recording side has a coercivity of not less than 50 Oe and not more than 200 Oe and the magnetic thin metal film adjacent to said magnetic thin film nearest to the information recording side individually has perpendicular magnetic anisotropy.

3. A longitudinal magnetic recording medium according to claim 1 wherein the magnetic thin metal film adjacent to the magnetic thin metal film nearest to the information recording side individually has longitudinal magnetic anisotropy.

4. A longitudinal magnetic recording medium according to claim 1 wherein the composite magnetic film has an in-plane coercivity of not less than 1,000 Oe.

5. A longitudinal magnetic recording medium according to claim 1 wherein the composite magnetic film has an in-plane coercivity of not less than 1,500 Oe.

6. A longitudinal magnetic recording medium according to claim 1 wherein the magnetic thin metal film nearest to the information recording side has a higher saturation magnetization than the magnetic thin metal film nearest to the substrate side.

7. A longitudinal magnetic recording medium according to claim 6 wherein the magnetic thin metal film nearest to the substrate side has the highest in-plane coercivity among the magnetic thin metal films constituting the composite magnetic film.

8. A longitudinal magnetic recording medium according to claim 7 wherein the saturation magnetization consecutively decreases in the direction from the magnetic thin metal film nearest to the information recording side to the magnetic thin metal film nearest to the substrate side, and the in-plane coercivity consecutively increases in the direction from the magnetic thin metal film nearest to the information recording side to the magnetic thin metal film nearest to the substrate side.

9. A longitudinal magnetic recording medium having a composite magnetic film comprising at least two magnetic thin metal films formed on a nonmagnetic substrate directly or through a nonmagnetic underlayer, in which the magnetic thin metal film nearest to an information recording side is a longitudinal magnetically anisotropic magnetic thin metal film containing, as a main component, an alloy containing at least one element selected from a first group consisting of Co and Fe, and at least one element selected from a second group consisting of N, Tb, Mo, W, Gd, Y, Sm, Nd, Pr, Pm, Ce, Dy, La, Pt, Ir, Ti, Zr, Hf, V, Nb, Ta, Ru, Os, Rh, Pd, Al and Si, and/or Ni, the magnetic thin metal film nearest to the substrate side differs from the magnetic thin metal film nearest to the information recording side in components or composition and contains, as a main component an alloy containing at least one element selected from the above first group and at least one element selected from a third group consisting of Cu, Cr, Mo, W, Tb, Gd, Sm, Nd, Pm, Pr, Ce, Dy, Pt and Ir, and/or Ni, all of the magnetic thin metal films constituting the composite magnetic film are magnetically coupled so as to have a single in-plane coercivity of not less than 250 Oe in magnetization reversal of the composite magnetic film to a longitudinal head magnetic field.

10. A longitudinal magnetic recording medium according to claim 9 wherein the magnetic thin metal film nearest to the information recording side contains at least element(s) from the above second group, and the total amount of element(s) from the above second group is not less than 0.1 at % and not more than 30 at % based on the total amount of element(s) from the above first group.

11. A longitudinal magnetic recording medium according to claim 10 wherein the magnetic thin metal film nearest to the information recording side contains at least Ni, and the amount of Ni is not less than 10 at % and not more than 60 at % based on the total amount of element(s) from the above first group.

12. A longitudinal magnetic recording medium according to claim 9 wherein the magnetic thin metal film nearest to the substrate side contains at least element(s) from the above third group and the amount of the element(s) from the third group is not less tan 0.1 at % and not more than 30 at % based on the total amount of element(s) from the above first group.

13. A longitudinal magnetic recording medium according to claim 12 wherein the magnetic thin metal film nearest to the substrate side contains at least Ni, and the amount of Ni is not less than 10 at % and not more than 60 at % based on the total amount of element(s) from the above first group.

14. A longitudinal magnetic recording medium according to claim 9 wherein the magnetic thin metal film nearest to the substrate side further contains not less than 0.1 at % and not more than 20 at %, based on the total amount of element(s) from the above first group, of at least one element selected from a four group consisting of Ti, Zr, Hf, Nb, Ta, Ru, Os, Rh, Pd, Al and Si, and is predominantly crystalline.

15. A longitudinal magnetic recording medium according to claim 9 wherein the magnetic thin metal film nearest to the information recording side is a CoNi-based three-element or four-element alloy, and the magnetic thin metal film nearest to the substrate side is a CoCr-based or CoSm-based three-element or four-element alloy.

16. A longitudinal magnetic recording medium according to claim 9 wherein the magnetic thin metal film nearest to the information recording side contains at least one of Fe and Bi.

17. A longitudinal magnetic recording medium according to claim 9 wherein the magnetic thin metal film nearest to the information recording side has a thickness not more than 2 times as large as that of the magnetic thin metal film nearest to the substrate side.

18. A longitudinal magnetic recording medium according to claim 17 wherein the magnetic thin metal film nearest to the information recording side has a thickness not more than 5 nm and not more than 100 nm.

19. A longitudinal magnetic recording medium according to claim 17 wherein the magnetic thin metal film nearest to the information recording side has a higher saturation magnetization than the magnetic thin metal film nearest to the substrate side.

20. A longitudinal magnetic recording medium according to claim 19 wherein the magnetic thin metal film nearest to the substrate side has the highest in-plane coercivity when the coercivities of the magnetic thin metal films constituting the composite magnetic film are measured individually.

21. A longitudinal magnetic recording medium according to claim 20 wherein the saturation magnetization consecutively decreases in the direction from the magnetic thin metal film nearest to the information recording side to the magnetic thin metal film nearest to the substrate side, and the in-plane coercivity consecutively increases in the direction from the magnetic thin metal film nearest to the information recording side to the magnetic thin metal film nearest to the substrate side.

22. A longitudinal magnetic recording medium according to claim 9 wherein the composite magnetic film comprises at least three kinds of magnetic thin metal films.

23. A longitudinal magnetic recording medium according to claim 9 wherein the magnetic thin metal film nearest to the information recording side has a coercivity of not less than 50 Oe and not more than 200 Oe and the magnetic thin metal film adjacent to the magnetic thin metal film nearest to the information recording side individually has perpendicular magnetic anisotropy.

24. A longitudinal magnetic recording medium according to claim 9 wherein the magnetic thin metal film adjacent to the magnetic thin metal film nearest to the information recording side individually has longitudinal magnetic anisotropy.

25. A longitudinal magnetic recording medium according to claim 8 wherein the composite magnetic film has an in-plane coercivity of not less than 1,000 Oe.

26. A longitudinal magnetic recording medium according to claim 25 wherein the composite magnetic film has an in-plane coercivity of not less than 1,500 Oe.

27. A longitudinal magnetic recording medium according to claim 9 wherein the nonmagnetic underlayer is composed of Cr, Mo, W, Ti, C, Ge or a nonmagnetic material containing these as a main component.

28. A longitudinal magnetic recording medium according to claim 9 wherein the magnetic thin metal film nearest to the information recording side further has, formed thereon, a nonmagnetic protective coating layer having a thickness of not less than 10 nm and not more than 40 nm.

29. A longitudinal magnetic recording medium comprising a composite magnetic film formed on a nonmagnetic substrate directly or through a nonmagnetic underlayer, in which the composite magnetic film is made of magnetic thin metal films and has a single in-plane coercivity and the in-plane coercivity is not less than 1,000 Oe, said in-plane coercivity being greater than the in-plane coercivity of a longitudinal anisotropic magnetic thin metal film which is nearest to an information recording side among the magnetic thin films constituting the composite film.

30. A longitudinal magnetic recording medium according to claim 29 wherein the above in-plane coercivity is not less than 1,500 Oe.

31. A magnetic memory unit comprising a longitudinal magnetic recording medium having a composite magnetic film made of a plurality of magnetic thin metal films on a non-magnetic substrate and having a longitudinal recording density of not less than 100 Mb/in$^2$ said in plane coercivity being greater than the in-plane coercivity of a longitudinal anisotropic magnetic thin metal film which is nearest to an information recording side among the magnetic thin films constituting the composite film.

32. A magnetic memory unit according to claim 31 wherein the longitudinal recording density is not less than 150 Mb/in$^2$.

33. A magnetic memory unit comprising the longitudinal magnetic recording medium recited in claim 1 and a ring type magnetic head for reading and writing of which the magnetic core is at least partially formed of a ferromagnetic core is at least partially formed of a ferromagnetic metal thin film.

34. A magnetic memory unit comprising the magnetic recording medium recited in claim 1 and an optical head for reading.

* * * * *